US008098539B2

(12) United States Patent
Sankuratri et al.

(10) Patent No.: US 8,098,539 B2
(45) Date of Patent: Jan. 17, 2012

(54) HYBRID SINGLE AND DUAL CHANNEL DDR INTERFACE SCHEME BY INTERLEAVING ADDRESS/CONTROL SIGNALS DURING DUAL CHANNEL OPERATION

(75) Inventors: Raghu Sankuratri, San Diego, CA (US); Michael Drop, San Diego, CA (US); Jian Mao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 12/547,578

(22) Filed: Aug. 26, 2009

(65) Prior Publication Data
US 2011/0055617 A1    Mar. 3, 2011

(51) Int. Cl.
*G11C 8/00* (2006.01)
(52) U.S. Cl. ......... 365/230.01; 365/233.13; 365/230.03; 365/189.18; 365/189.19
(58) Field of Classification Search .............. 365/230.1, 365/233.13, 230.03, 189.18, 189.19
See application file for complete search history.

(56) References Cited

U.S. PATENT DOCUMENTS

| 6,834,014 B2 * | 12/2004 | Yoo et al. ............... 365/230.06 |
| 2002/0018393 A1 | 2/2002 | Kyung |
| 2004/0037133 A1 | 2/2004 | Park et al. |
| 2008/0049505 A1 * | 2/2008 | Kim et al. ............... 365/185.11 |

FOREIGN PATENT DOCUMENTS
EP          1191445       3/2002

OTHER PUBLICATIONS

International Search Report and Written Opinion—PCT/US2010/046858, International Search Authority—European Patent Office—Oct. 22, 2010.

* cited by examiner

*Primary Examiner* — Thong Q Le
(74) *Attorney, Agent, or Firm* — Nicholas J. Pauley; Peter M. Kamarchik; Jonathan T. Velasco

(57) ABSTRACT

A memory structure is described. In one embodiment, the memory structure comprises a memory controller configured to receive a clock signal and to be coupled to a plurality of memory modules via a single address/control bus. The memory controller couples to each of the plurality of memory modules via a separate chip select signal for each memory module. The memory controller issues commands across the address/control bus to the memory modules in an interleaved fashion in accordance with the timing supplied by the clock. During a waiting period after issuance of a command to one memory module, the memory controller can issue commands to a different memory module.

37 Claims, 11 Drawing Sheets

HYBRID SINGLE AND DUAL CHANNEL DDR INTERFACE SCHEME BY INTERLEAVING ADDRESS/CONTROL SIGNALS DURING DUAL CHANNEL OPERATION

FIELD OF THE DISCLOSURE

Embodiments of the inventive concepts disclosed herein relate generally to the field of data processing systems. More particularly, embodiments of the inventive concepts disclosed herein relate to a dual-channel double data rate interface scheme utilizing a single address/control bus by interleaving address/control signals.

BACKGROUND

Data processing systems can include various components that interact with each other to process an instruction. These components can include a computer bus and memory controller interacting with random access memory (RAM). A double data rate (DDR) synchronous dynamic RAM (SDRAM) operates through use of an external clock to synchronize operation of the memory with an external data bus. In this scheme, data transfers occur on both the rising and the falling edges of a clock signal, thereby doubling the data transmission rate relative to single data rate approaches. The DDR approach to memory operation includes the original DDR standard as well as later-developed DDR2 and DDR3 approaches.

The architecture of a data processing system can comprise a dual-channel architecture to double the channel throughput capacity from the RAM to an associated memory controller. In such an architecture, two or more SDRAM memory modules are installed in matching memory banks and accessed by a memory controller through separate data channels.

One known approach to memory architecture implementation is to utilize a single DDR memory controller to control two X-bit DDR memory modules (where "X-bit" can be 8 bits, 16 bits, 32 bits, etc.). Operating this architecture with separate data busses but a single address/control signal bus and a single chip select signal yields an architecture that effectively operates as a single 2X-bit DDR memory module. In such an architecture, the DDR controller interacts with two separate X-bit DDR memory modules via separate data busses. Both memory modules are clocked by the same clock signals. In addition both memory modules are controlled by the same clock enable signal and the same chip select signal. The availability of a second set of clock enable and chip select signals allows the architecture to be expanded to operate with a second set of memory modules. Both memory modules are coupled to the memory controller via the same address/control bus. Thus, for example, if each of the memory modules is a 16-bit memory, this architecture effectively operates as a single channel 32-bit device.

Another example architecture utilizes a single memory controller with two X-bit DDR memory modules, two separate data busses, and two separate address/control signal busses to operate as a true dual-channel system. In this approach, both memory modules are clocked by the same clock signals, but are controlled by different clock enable signals and different chip select signals. In addition, each memory module couples to the memory controller via its own separate address/control bus. This architecture results in true dual-channel operation.

Performance of the data processing system can depend on the nature of the data transfers. For data transfers in small bursts, it has been suggested that a dual-channel architecture can result in better performance than a single channel architecture with the same aggregate memory size. There are also systems where the data traffic can be of mixed burst lengths, i.e. small data bursts and large data bursts. However, in the dual-channel approach, duplication of the address/control bus leads to an increase in pin count over the single-channel configuration. For example, for a typical 32-bit single channel DDR interface, the pin count may be 66 pins. Due to the duplication of the address/control bus, the corresponding dual 16-bit channel DDR interface may have 86 pins. Hence the dual-channel approach may result in a 30% increase in the pin count over a single-channel approach with the same aggregate memory. The dual-channel approach is thus incompatible with a typical single-channel design, and taking advantage of the performance of the dual-channel architecture therefore increases the cost of the system level design. The increase in pin count prevents the simple replacement of a single-channel approach with a dual-channel approach.

Accordingly, a dual channel approach that avoids the increase in the pin count and can be compatible with the single-channel architecture while nonetheless yielding performance increase over the single-channel approach is desired. Furthermore, a hybrid approach of supporting both a single channel mode and a dual channel mode without any additional pin increase would also increase performance of the system.

SUMMARY OF THE DISCLOSURE

In an embodiment, a memory structure is described. The memory structure comprises a memory controller configured to receive a clock signal and to be coupled to a plurality of memory modules via a single address/control bus. The memory controller is also configured to issue separate chip select signals to each of the plurality of memory modules. The memory controller is configured to interleave issuance of commands on the address/control bus to the two different memory modules in accordance with timing supplied by the clock signal. In particular, the memory controller issues a command across the address/control bus to a memory module and then during a time period following the issuance of this command issues a command across the address/control bus to a second memory module. This operation of the memory controller serves to increase performance relative to the operation of a typical single-channel architecture while not increasing pin count.

This illustrative embodiment is mentioned not to limit or define the inventive concepts disclosed herein, but to provide examples to aid understanding thereof. Other aspects, advantages, and features of the present disclosure will become apparent after review of the entire application, including the following sections: Brief Description of the Drawings, Detailed Description, and the Claims.

BRIEF DESCRIPTION OF THE DRAWINGS

These and other features, aspects, and advantages of the present inventive concepts disclosed herein are better understood when the following Detailed Description is read with reference to the accompanying drawings, wherein.

DETAILED DESCRIPTION

Throughout the description, for the purposes of explanation, numerous specific details are set forth in order to provide a thorough understanding of the inventive concepts disclosed herein. It will be apparent, however, to one skilled in the art that the inventive concepts disclosed herein may be practiced without some of these specific details. In other instances, well-known structures and devices are shown in block diagram form to avoid obscuring the underlying principles of the inventive concepts disclosed herein.

Embodiments of the inventive concepts disclosed herein relate to a dual X-bit channel DDR memory interface. "X-bit" as used herein refers to the size of the memory modules utilized and can be 8-bit, 16-bit, 32-bit, 64-bit, 128-bit, etc. "DDR" as used herein refers to the double data rate standard for transferring data on both the rising and the falling edges of a clock signal and encompasses the DDR, DDR2, and DDR3 standards as well as future, compatible standards.

Figure 1:
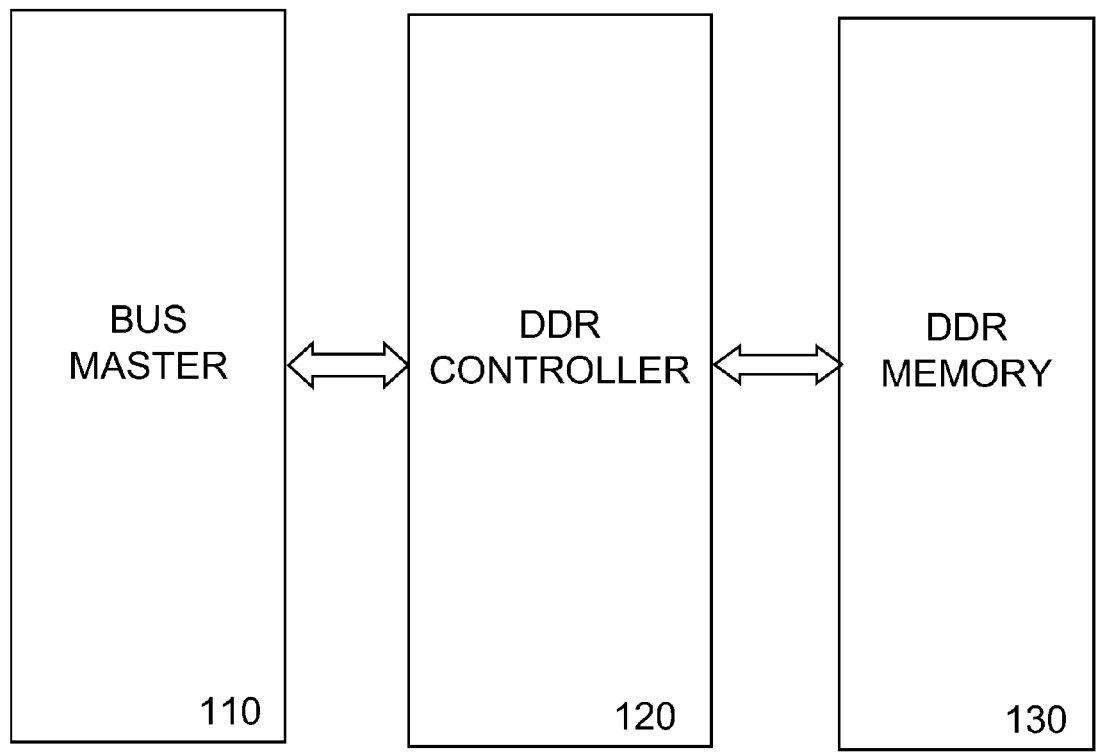
FIG. 1 is a diagram illustrating a functional relationship between components in an embodiment.
Figure 2:
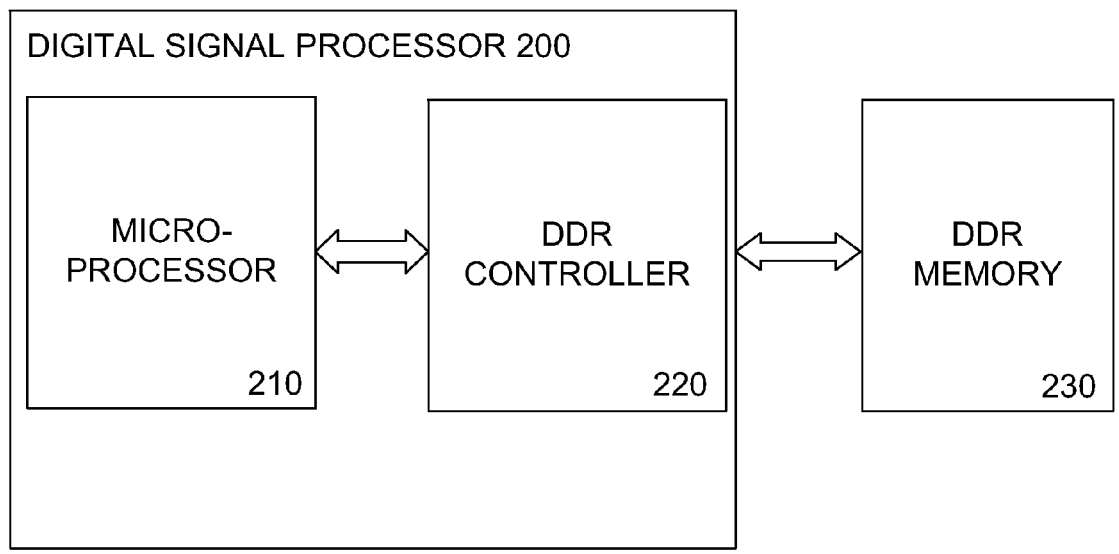
FIG. 2 is a diagram illustrating a relationship between components in an embodiment.

FIG. 1 is a general illustration showing a functional relationship between a bus master 110, a DDR controller 120, and a DDR memory 130. The bus master can be a microprocessor. In this relationship the DDR controller 120 supports access to the DDR memory 130 by the bus master 110. In some embodiments the DDR controller can be included in a digital signal processor. FIG. 2 illustrates an exemplary digital signal processor 200 encompassing a microprocessor 210 and a DDR controller 220 and its relationship to a DDR memory 230.

Figure 3:
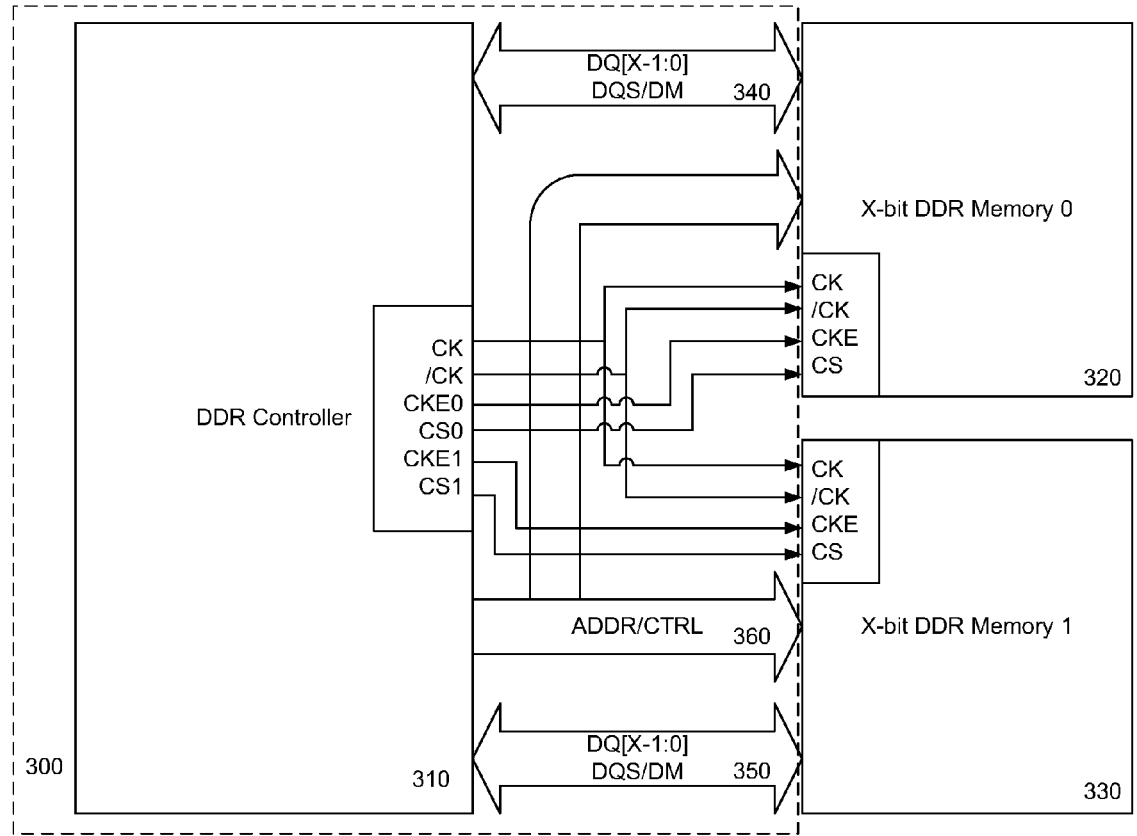
FIG. 3 is a diagram illustrating an embodiment of a dual X-bit channel DDR memory interface architecture.

In one embodiment, the dual X-bit channel DDR memory interface operates with separate data busses and separate clock enable and chip select signals for each memory module but a single address/control signal bus and a single clock (CK, /CK signals). Using a single address/control bus, the interface can achieve dual-channel operation by interleaving address/control signals and toggling operations between memory modules. FIG. 3 illustrates one embodiment of the dual X-bit channel DDR memory interface 300. DDR memory controller 310 interacts with X-bit DDR memory zero 320 and X-bit DDR memory one 330 via separate data busses 340, 350. Both memory modules 320, 330 are clocked by the same signals CK and /CK. However, memory modules 320, 330 are each controlled by separate clock enable signals CKE0, CKE1 and separate chip select signals CS0, CS1 respectively. Both memory modules 320, 330 couple to DDR memory controller 330 via the same address/control bus 360.

The clock enable signals CKE0 and CKE1 enable the operation of power-saving features by permitting the DDR memory controller 310 to disable clocking of either memory module 320 or 330 when such memory module is not utilized for a period of time. In addition, the chip select signals CS0, CS1 permit the DDR memory controller 310 to toggle operations between memory modules 320 and 330 as needed.

Major DDR commands are not issued on every clock cycle and certain embodiments can take advantage of this to increase data processing efficiency. For example, when the DDR memory controller 310 issues a PRECHARGE command to memory module 320, the DDR memory controller 310 waits a period of time, denoted tRP, before issuing the next command to that same memory module 320. In this embodiment, rather than remain quiescent during the waiting period, the DDR memory controller 310 can issue a command to the other memory module 330. Thus, if the DDR memory controller 310 has issued a PRECHARGE command to memory module 320, then during the tRP waiting period following issuance of this command, the DDR memory controller 310 may activate CS1 to enable operation with memory module 330 and issue a command to memory module 330. Depending on the command, there can be a waiting time following issuance of the command to memory module 330 before the next command is issued to that same memory module. Hence, if the waiting period tRP following issuance of the PRECHARGE command to memory module 320 has elapsed, then during the waiting period following issuance of the command to memory module 330 the DDR memory controller 310 may issue a next command to memory module 320. This interleaving of commands can continue, thereby allowing the DDR memory controller 310 to increase performance relative to the performance of the same DDR controller operating in a single 2X-bit channel architecture, which also has a single address/control channel. Thus, performance increase of dual X-bit channel operation without the corresponding increase in pin count can be achieved.

The major DDR commands and their corresponding post-issuance wait times are as follows:

| DDR Command | Wait Time |
| --- | --- |
| ACTIVE | tRCD |
| PRECHARGE | tRP |
| AUTO REFRESH | tRFC |
| LOAD MODE REGISTER | tMRD |
| READ/WRITE | BL/2 where BL is the burst length |

Commands may be put into a queue, and the DDR memory controller 310 issues them one after another. Although the burst length can be 2, 4, or 8 cycles, for example, typically it is set at 4 or 8. BL=2 cycles can permit READ/WRITE operations to occur every clock cycle. Systems typically do not operate in this fashion. Each of tRP, tRCD, tRFC, and tMRD is typically greater than or equal to 2 cycles for at-speed operation. This provides the opportunity to interleave commands to the separate memory modules 320, 330.

Figure 4:
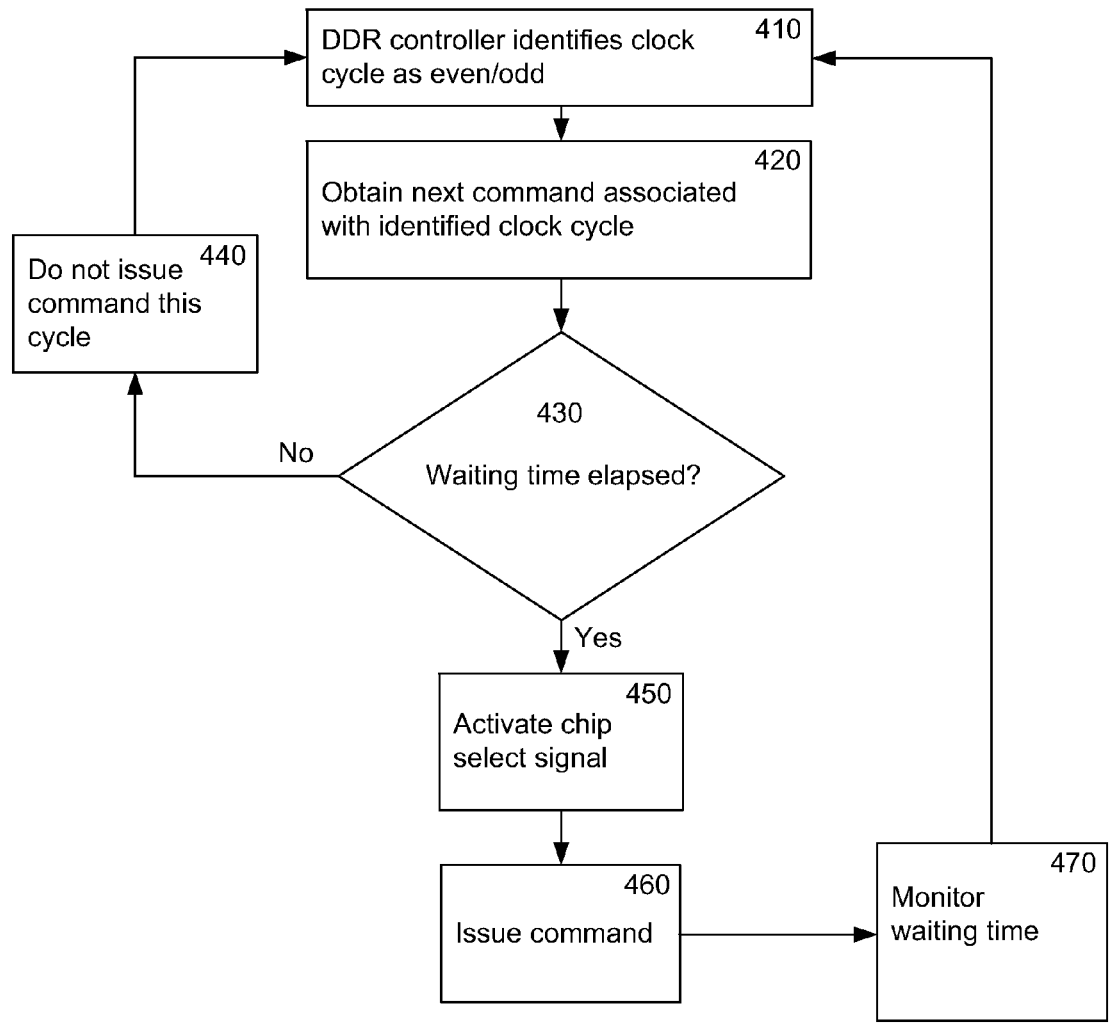
FIG. 4 is a flowchart illustrating an embodiment of interleaving address/control signals between two memory modules.

In one embodiment, interleaving occurs by assigning even cycle commands to one memory module 320 and odd cycle commands to the other memory module 330. FIG. 4 illustrates an embodiment of this approach. At block 410 the DDR memory controller 310 identifies the current clock cycle as even or odd. For example, an even clock cycle is associated with memory module 320, whereas an odd clock cycle is associated with memory module 330. After identifying the clock cycle as even or odd, at block 420 the DDR memory controller 310 obtains the next command to be issued to the corresponding memory module 320 or 330 as appropriate (e.g. memory module 320 if the clock cycle is even, memory module 330 if the clock cycle is odd). At decision block 430, the DDR memory controller 310 determines if the waiting time following issuance of the previous command to the memory module has elapsed. If the waiting time has not yet elapsed, then the DDR memory controller 310 does not issue a command on this clock cycle, as indicated at block 440, and the operation returns to block 410 for the next clock cycle. If the waiting time has elapsed, then at block 450 the DDR memory controller 310 activates the chip select signal for the appropriate memory module if it is not already active and then issues the command at block 460. The DDR memory controller 310 then begins monitoring the appropriate waiting time that follows the issuance of the command at block 470 and then returns operation to block 410.

In a different embodiment, DDR memory controller 310 dynamically multiplexes address/control commands to the memory modules 320, 330 onto the address/control bus 360 based on the idle condition of the bus. Thus, for example, if the wait time before DDR memory controller 310 can issue a next command to memory module 320 is such that the DDR memory controller 310 can issue multiple commands to memory module 330, then it is more efficient for the DDR memory controller 310 to issue these multiple commands to memory module 330 rather than waiting to alternate commands between the memory modules 320, 330. DDR memory controller 310 can comprise hardware logic to monitor the commands in the queue and their associated wait times and, based on that information, to control issuance of commands to optimize bandwidth usage.

Figure 5:
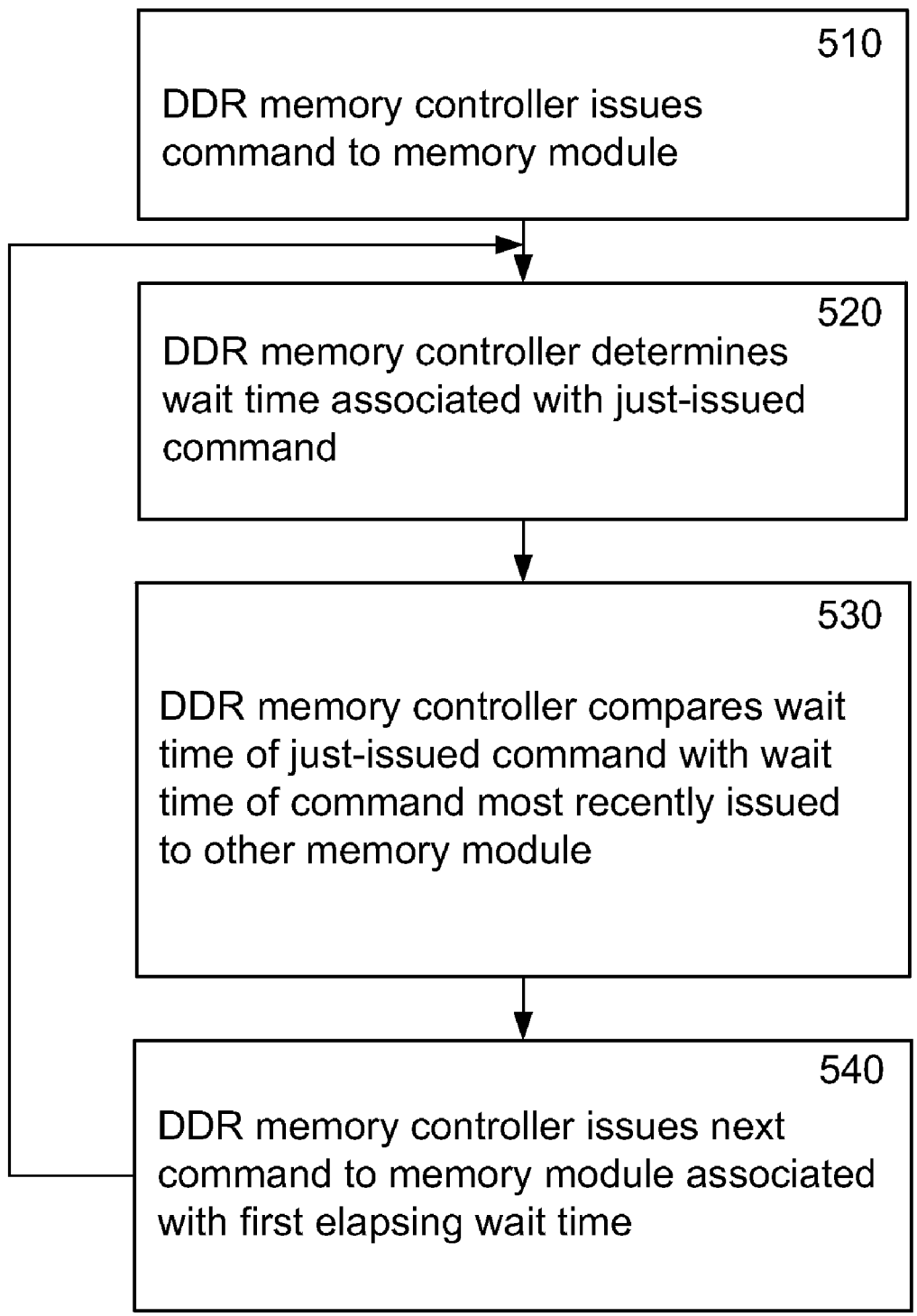
FIG. 5 is a flowchart illustrating an embodiment of multiplexing address/control signals between two memory modules.

FIG. 5 illustrates one embodiment of dynamically multiplexing address/control commands to the memory modules 320, 330. At block 510, DDR memory controller 310 issues a command to a memory module 320. DDR memory controller 310 then determines a wait time associated with the just issued command at block 520. Although a subsequent command cannot be issued to the same memory module 320 during the wait time, it may be possible to issue a command to the other memory module 330 during this wait time if the wait time associated with a previously issued command to that memory module 330 has already elapsed. Hence, at block 530 DDR memory controller 310 compares the wait times associated with the most recently issued commands to each of the different memory modules 320, 330 to determine which wait time will elapse first. After identified wait time elapses, DDR memory controller 310 then issues the next command to the appropriate memory module 320 or 330 whose wait time has elapsed first at block 540. The operation then returns to block 520. One of ordinary skill in the art will recognize that this embodiment is just one approach to optimizing the address/control bus bandwidth and that other variations are possible.

Figure 6:
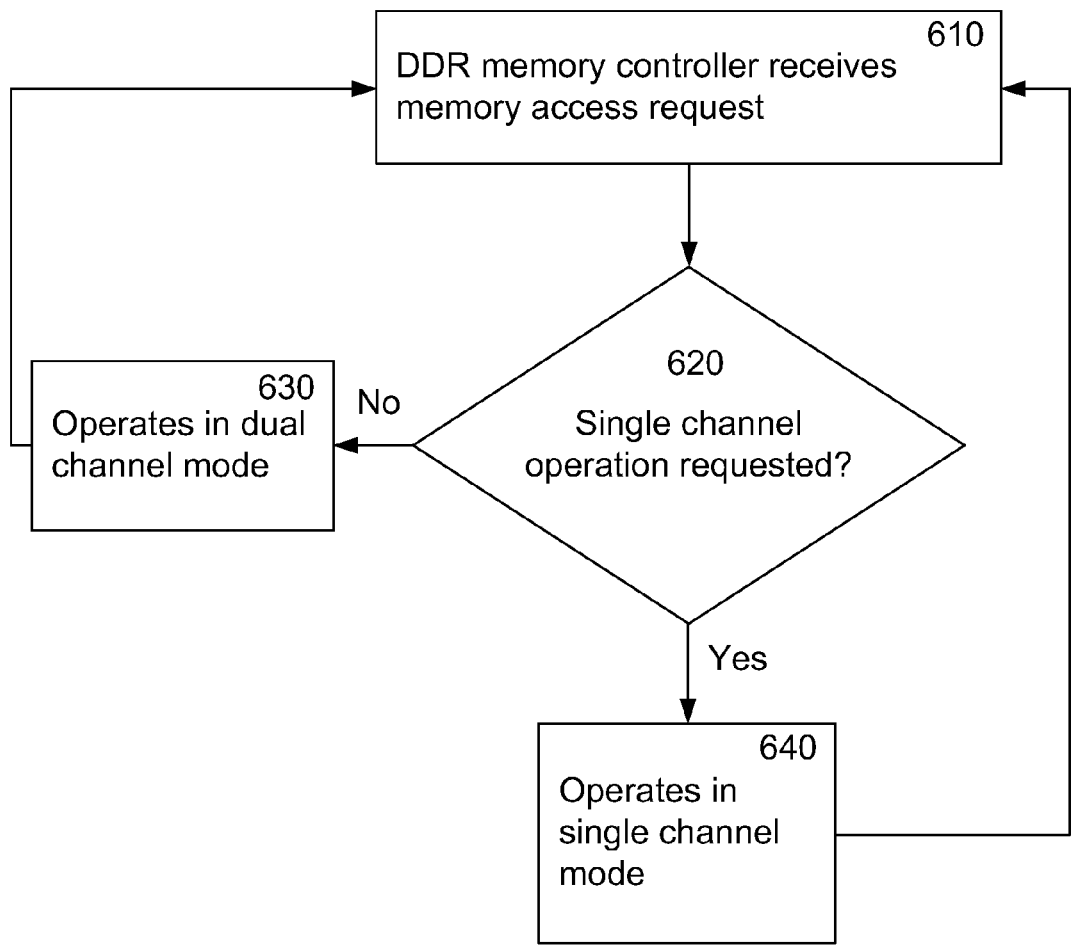
FIG. 6 is a flowchart illustrating an embodiment of switching between single channel and dual channel operation.

In one embodiment, DDR memory controller 310 is configured to dynamically switch between single and dual channel operation. In this embodiment, DDR memory controller 310 has the capability to send the same clock enable signal and the same chip select signal to each of memory modules 320, 330. In dual channel operation, DDR memory controller 310 operates as discussed above with separate clock enable and separate chip select signals being sent to the different memory modules. However, in single channel operation, DDR memory controller 310 sends the same clock enable signal and the same chip select signal to each of memory modules 320 and 330 and issues commands across the address/control bus 360 to operate as a traditional single 2X-bit memory structure. FIG. 6 illustrates an embodiment of this approach. At block 610 DDR memory controller 310 receives a memory access request. At decision block 620, DDR memory controller 310 decides whether the request is for single channel operation or for dual channel operation. One possible trigger for this decision is the region of memory that is being accessed. For example certain memory regions may be associated with single channel operation whereas other memory regions may be associated with dual channel operation. If the request is for single channel operation, then at block 630 DDR memory controller 310 implements single channel operation, after which the process returns to block 610 for the next memory access request. If on the other hand the request is for dual channel operation, then at block 640 DDR memory controller implements dual channel operation, after which the process returns to block 610 for the next memory access request.

Example Devices Including the Above-Described Features

Figure 7:
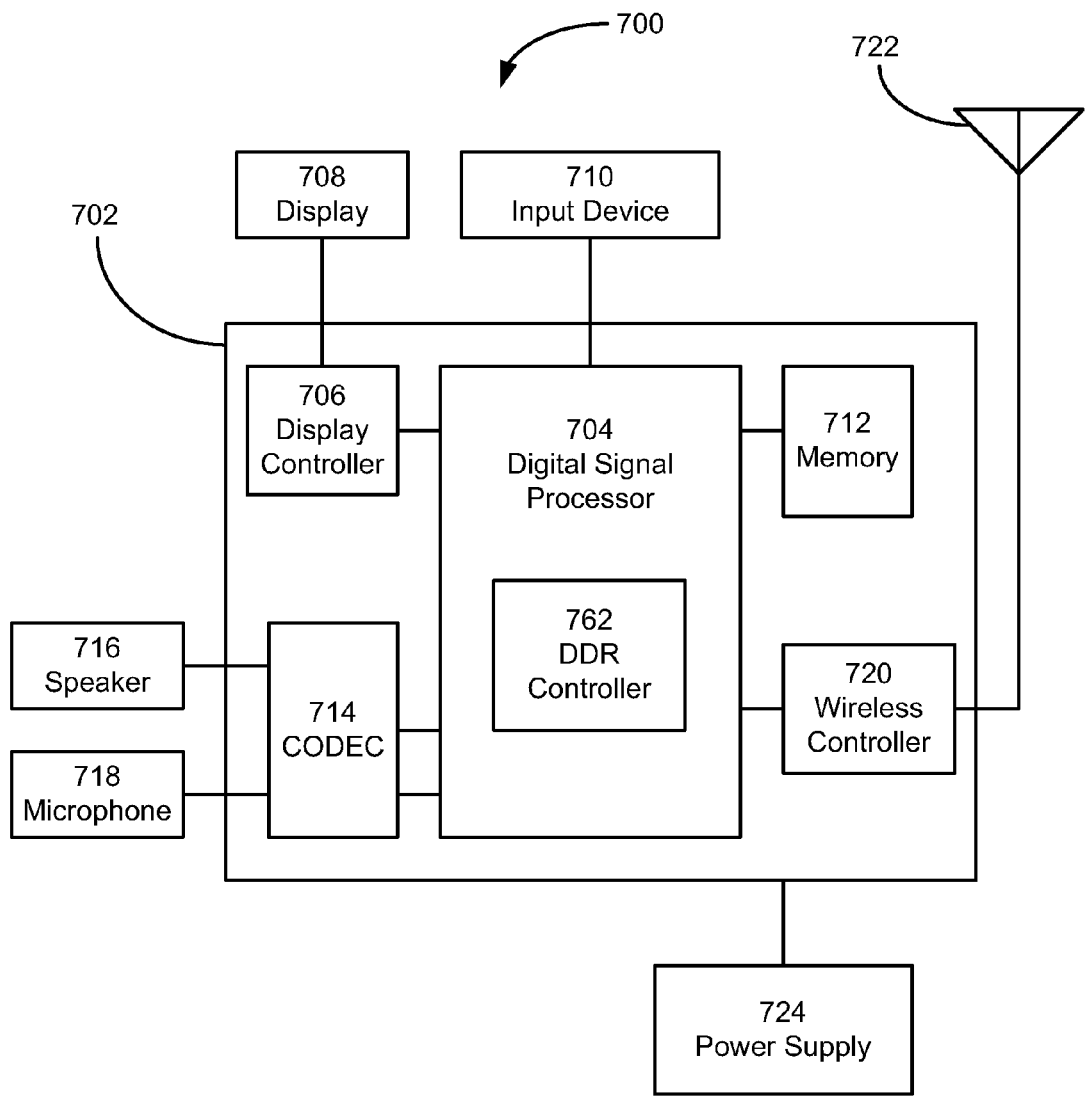
FIG. 7 is a diagram illustrating an example portable communication device that may include a dual X-bit channel DDR memory interface architecture.

FIG. 7 is a diagram illustrating an exemplary embodiment of a portable communication device 700. As illustrated in the general diagram of FIG. 7, the portable communication device includes an on-chip system 702 that includes a digital signal processor (DSP) 704. The general diagram of FIG. 7 also shows a display controller 706 that is coupled to the digital signal processor (DSP) 704 and a display 708. Moreover, an input device 710 is coupled to the DSP 704. As shown, a memory 712 is coupled to the DSP 704. Additionally, a coder/decoder (CODEC) 714 may be coupled to the DSP 704. A speaker 716 and a microphone 718 may be coupled to the CODEC 614.

The general diagram of FIG. 7 further illustrates a wireless controller 720 coupled to the digital signal processor 704 and a wireless antenna 722. In a particular embodiment, a power supply 724 is coupled to the on-chip system 702. The display 708, the input device 710, the speaker 716, the microphone 718, the wireless antenna 722, and the power supply 724 may be external to the on-chip system 702. However, each can be coupled to a component of the on-chip system 702.

In a particular embodiment, the digital signal processor 704 includes a DDR memory controller 762, such as is described with reference to FIGS. 1-3, that can manage data flow between DSP 704 and memory modules in memory 712 and that can provide a performance increase relative to a single 2X-bit channel architecture without increasing pin count.

Figure 8:
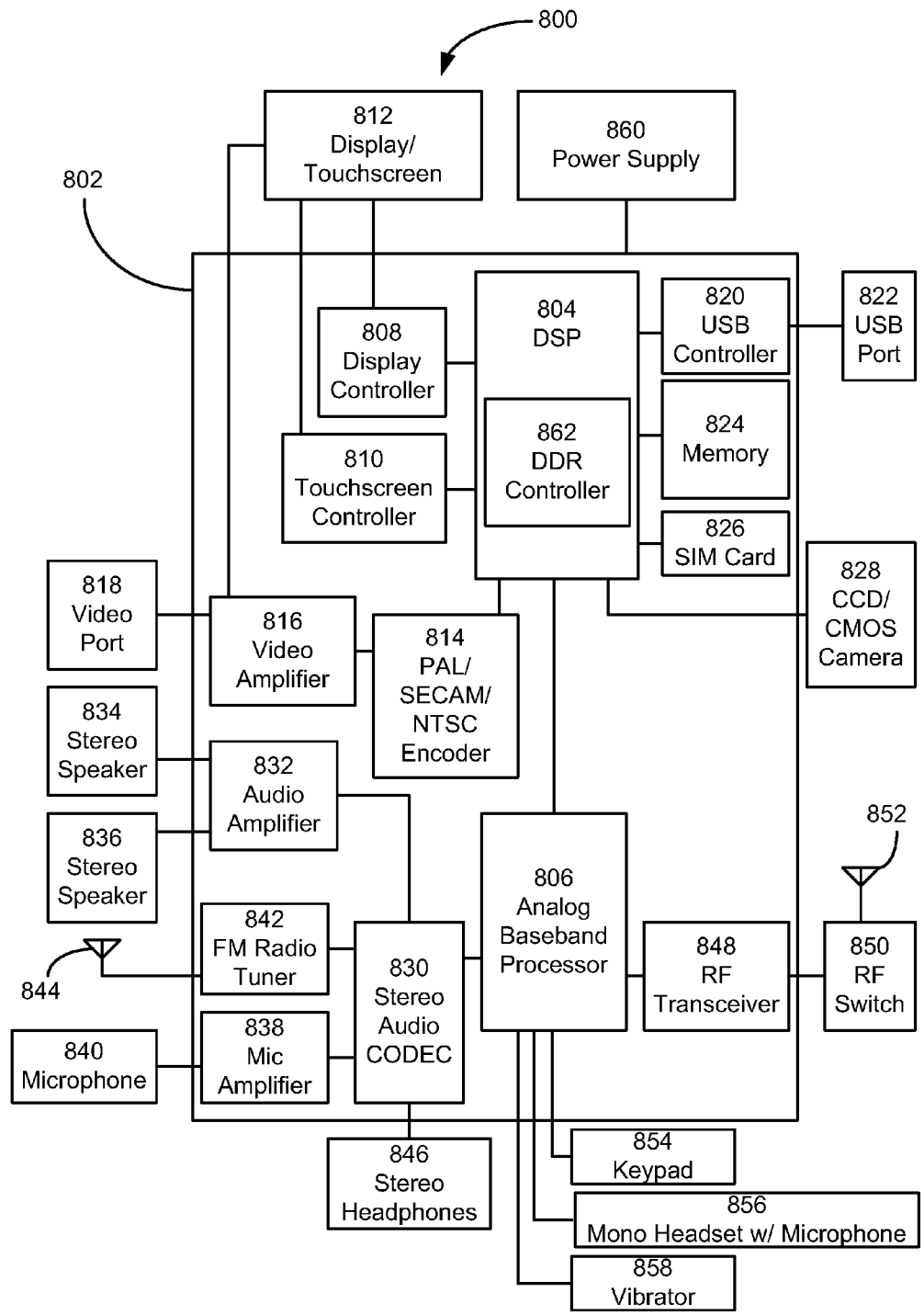
FIG. 8 is a diagram illustrating an example cellular telephone that may include a dual X-bit channel DDR memory interface architecture.

FIG. 8 is a diagram illustrating an exemplary embodiment of a cellular telephone 800. As shown, the cellular telephone 800 includes an on-chip system 802 that includes a digital baseband processor 804 and an analog baseband processor 806 that are coupled together. In a particular embodiment, the digital baseband processor 804 is a digital signal processor. As illustrated in the general diagram of FIG. 8, a display controller 808 and a touchscreen controller 810 are coupled to the digital baseband processor 804. In turn, a touchscreen display 812 external to the on-chip system 802 is coupled to the display controller 808 and the touchscreen controller 810.

The general diagram of FIG. 8 further illustrates a video encoder 814, e.g., a phase alternating line (PAL) encoder, a sequential couleur a memoire (SECAM) encoder, or a national television system(s) committee (NTSC) encoder, is coupled to the digital baseband processor 804. Further, a video amplifier 816 is coupled to the video encoder 814 and the touchscreen display 812. Also, a video port 818 is coupled to the video amplifier 816. A universal serial bus (USB) controller 820 is coupled to the digital baseband processor

804. Also, a USB port 822 is coupled to the USB controller 820. A memory 824 and a subscriber identity module (SIM) card 826 may also be coupled to the digital baseband processor 804. Further, as shown in the general diagram of FIG. 8, a digital camera 828 may be coupled to the digital baseband processor 804. In an exemplary embodiment, the digital camera 828 is a charge-coupled device (CCD) camera or a complementary metal-oxide semiconductor (CMOS) camera.

As further illustrated in the general diagram of FIG. 8, a stereo audio CODEC 830 may be coupled to the analog baseband processor 806. Moreover, an audio amplifier 832 may be coupled to the stereo audio CODEC 830. In an exemplary embodiment, a first stereo speaker 834 and a second stereo speaker 836 are coupled to the audio amplifier 832. A microphone amplifier 838 may be also coupled to the stereo audio CODEC 830. Additionally, a microphone 840 may be coupled to the microphone amplifier 838. In a particular embodiment, a frequency modulation (FM) radio tuner 842 may be coupled to the stereo audio CODEC 830. An FM antenna 844 can be coupled to the FM radio tuner 842. Further, stereo headphones 846 may be coupled to the stereo audio CODEC 830.

The general diagram of FIG. 8 further illustrates a radio frequency (RF) transceiver 848 that may be coupled to the analog baseband processor 806. An RF switch 850 may be coupled to the RF transceiver 848 and an RF antenna 852. A keypad 854 may be coupled to the analog baseband processor 806. Also, a mono headset with a microphone 856 may be coupled to the analog baseband processor 806. Further, a vibrator device 858 may be coupled to the analog baseband processor 806. The general diagram of FIG. 8 also shows a power supply 860 that may be coupled to the on-chip system 802. In a particular embodiment, the power supply 860 is a direct current (DC) power supply that provides power to the various components of the cellular telephone 800. Further, in a particular embodiment, the power supply is a rechargeable DC battery or a DC power supply that is derived from an alternating current (AC) to DC transformer that is coupled to an AC power source.

As depicted in the general diagram of FIG. 8, the touchscreen display 812, the video port 818, the USB port 822, the camera 828, the first stereo speaker 834, the second stereo speaker 836, the microphone 840, the FM antenna 844, the stereo headphones 846, the RF switch 850, the RF antenna 852, the keypad 854, the mono headset 856, the vibrator 858, and the power supply 860 may be external to the on-chip system 802.

In a particular embodiment, the digital baseband processor 804 includes a DDR controller 862, such as is described with reference to FIGS. 1-3, that can manage data flow between DSP 804 and memory 824 and that can provide a performance increase relative to a single 2X-bit channel architecture without increasing pin count.

Figure 9:
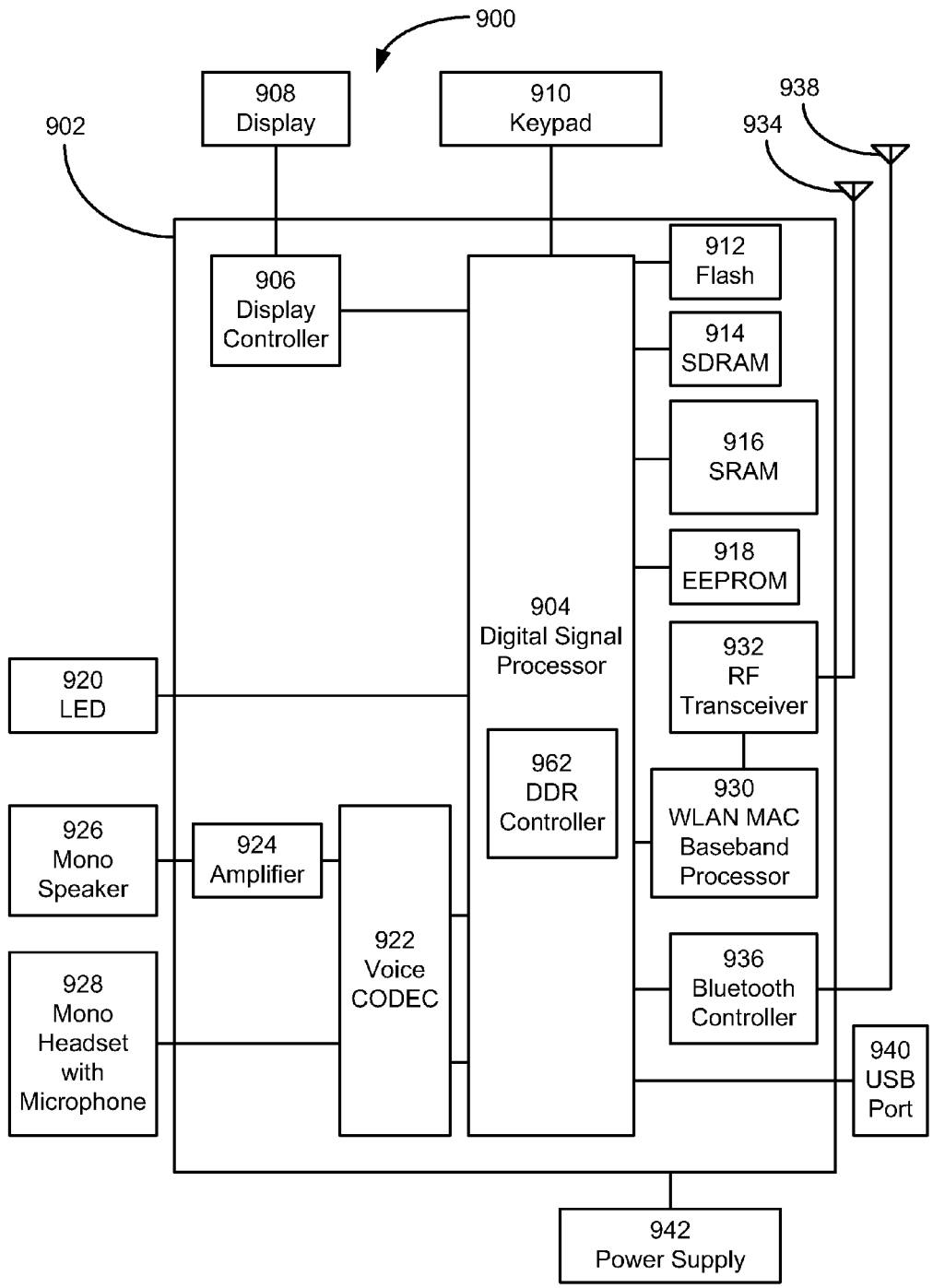
FIG. 9 is a diagram illustrating an example wireless Internet Protocol telephone that may include a dual X-bit channel DDR memory interface architecture.

FIG. 9 is a diagram illustrating an exemplary embodiment of a wireless Internet protocol (IP) telephone 900. As shown, the wireless IP telephone 900 includes an on-chip system 902 that includes a digital signal processor (DSP) 904. A display controller 906 may be coupled to the DSP 904 and a display 908 is coupled to the display controller 906. In an exemplary embodiment, the display 908 is a liquid crystal display (LCD). FIG. 9 further shows that a keypad 910 may be coupled to the DSP 904.

A flash memory 912 may be coupled to the DSP 904. A synchronous dynamic random access memory (SDRAM) 914, a static random access memory (SRAM) 916, and an electrically erasable programmable read only memory (EEPROM) 918 may also be coupled to the DSP 904. The general diagram of FIG. 9 also shows that a light emitting diode (LED) 920 may be coupled to the DSP 904. Additionally, in a particular embodiment, a voice CODEC 922 may be coupled to the DSP 904. An amplifier 924 may be coupled to the voice CODEC 922 and a mono speaker 926 may be coupled to the amplifier 924. The general diagram of FIG. 9 further illustrates a mono headset 928 coupled to the voice CODEC 922. In a particular embodiment, the mono headset 928 includes a microphone.

A wireless local area network (WLAN) baseband processor 930 may be coupled to the DSP 904. An RF transceiver 932 may be coupled to the WLAN baseband processor 930 and an RF antenna 934 may be coupled to the RF transceiver 932. In a particular embodiment, a Bluetooth controller 936 may also be coupled to the DSP 904 and a Bluetooth antenna 938 may be coupled to the controller 936. The general diagram of FIG. 9 also shows that a USB port 940 may also be coupled to the DSP 904. Moreover, a power supply 942 is coupled to the on-chip system 902 and provides power to the various components of the wireless IP telephone 900.

As indicated in the general diagram of FIG. 9, the display 908, the keypad 910, the LED 920, the mono speaker 926, the mono headset 928, the RF antenna 934, the Bluetooth antenna 938, the USB port 940, and the power supply 942 may be external to the on-chip system 902 and coupled to one or more components of the on-chip system 902.

In a particular embodiment, the DSP 904 includes a DDR controller 962, such as is described with reference to FIGS. 1-3, that can manage data flow between DSP 904 and memory 914 and that can provide a performance increase relative to a single 2X-bit channel architecture without increasing pin count.

Figure 10:
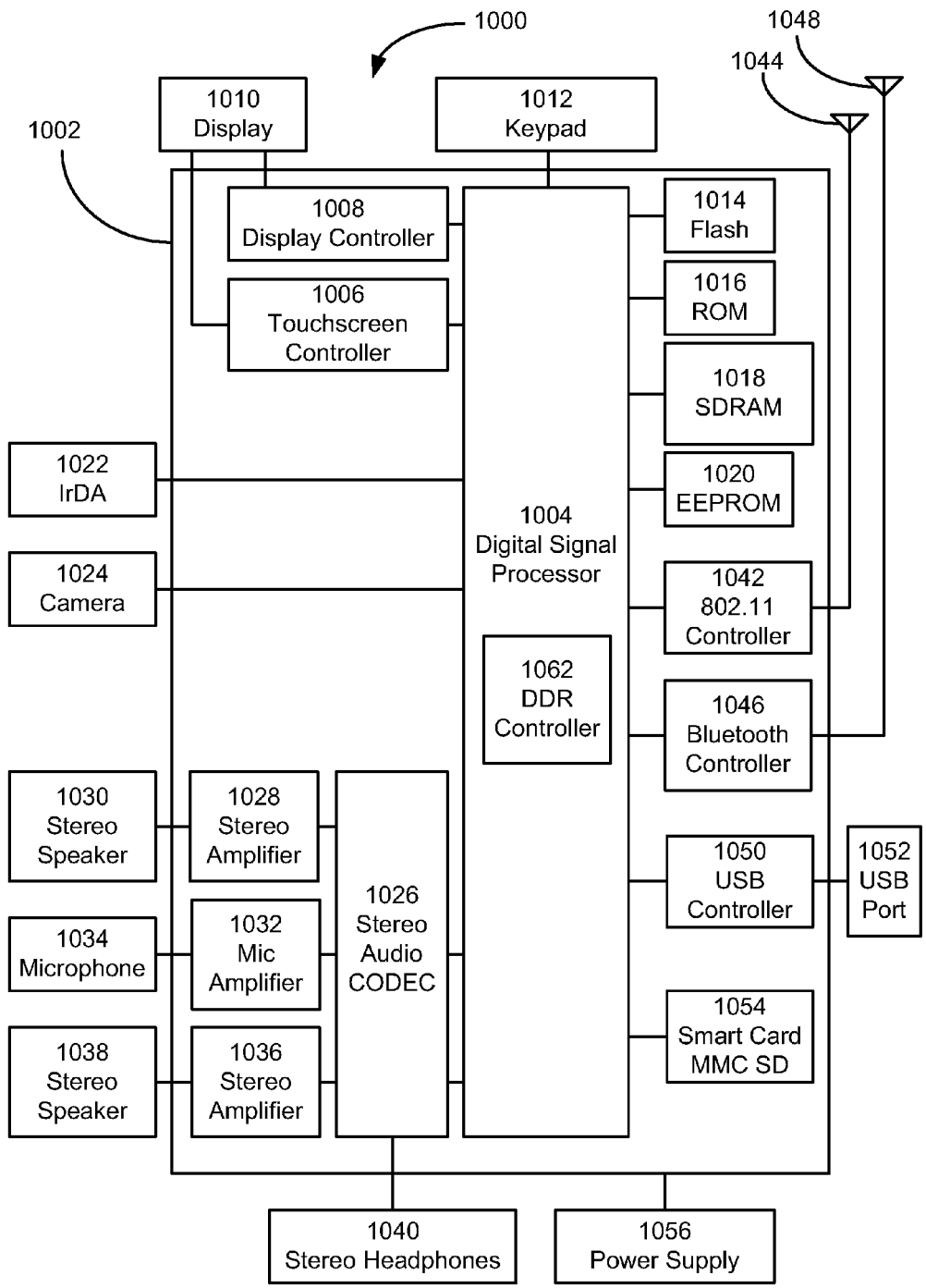
FIG. 10 is a diagram illustrating an example portable digital assistant that may include a dual X-bit channel DDR memory interface architecture.

FIG. 10 is a diagram illustrating an exemplary embodiment of a portable digital assistant (PDA) 1000. As shown, the PDA 1000 includes an on-chip system 1002 that includes a digital signal processor (DSP) 1004. A flash memory 1014 may be coupled to the DSP 1004. A read only memory (ROM) 1016, a synchronous dynamic random access memory (SDRAM) 1018, and an electrically erasable programmable read only memory (EEPROM) 1020 may also be coupled to the DSP 1004. A touchscreen controller 1006 and a display controller 1008 are coupled to the DSP 1004. Further, a touchscreen display 1010 is coupled to the touchscreen controller 1006 and to the display controller 1008. The general diagram of FIG. 10 also indicates that a keypad 1012 may be coupled to the DSP 1004.

In a particular embodiment, a stereo audio CODEC 1026 may be coupled to the DSP 1004. A first stereo amplifier 1028 may be coupled to the stereo audio CODEC 1026 and a first stereo speaker 1030 may be coupled to the first stereo amplifier 1028. Additionally, a microphone amplifier 1032 may be coupled to the stereo audio CODEC 1026 and a microphone 1034 may be coupled to the microphone amplifier 1032. The general diagram of FIG. 10 further shows a second stereo amplifier 1036 that may be coupled to the stereo audio CODEC 1026 and a second stereo speaker 1038 that may be coupled to the second stereo amplifier 1036. In a particular embodiment, stereo headphones 1040 may also be coupled to the stereo audio CODEC 1026.

The general diagram of FIG. 10 also illustrates an 802.11 controller 1042 that may be coupled to the DSP 1004 and an 802.11 antenna 1044 that may be coupled to the 802.11 controller 1042. Moreover, a Bluetooth controller 1046 may be coupled to the DSP 1004 and a Bluetooth antenna 1048 may be coupled to the Bluetooth controller 1046. A USB controller 1050 may be coupled to the DSP 1004 and a USB port 1052 may be coupled to the USB controller 1050. Additionally, a smart card 1054, e.g., a multimedia card (MMC) or a secure digital card (SD), may be coupled to the DSP 1004. Further, a power supply 1056 may be coupled to the on-chip system 1002 and may provide power to the various components of the PDA 1000.

As indicated in the general diagram of FIG. 10, the display 1010, the keypad 1012, the IrDA port 1022, the digital camera 1024, the first stereo speaker 1030, the microphone 1034, the second stereo speaker 1038, the stereo headphones 1040, the 802.11 antenna 1044, the Bluetooth antenna 1048, the USB port 1052, and the power supply 1056 may be external to the on-chip system 1002 and coupled to one or more components on the on-chip system 1002.

In a particular embodiment, the DSP 1004 includes a DDR controller 1062, as described with reference to FIGS. 1-3, that can manage data flow between DSP 1004 and memory 1018 and that can provide a performance increase relative to a single 2X-bit channel architecture without increasing pin count.

Figure 11:
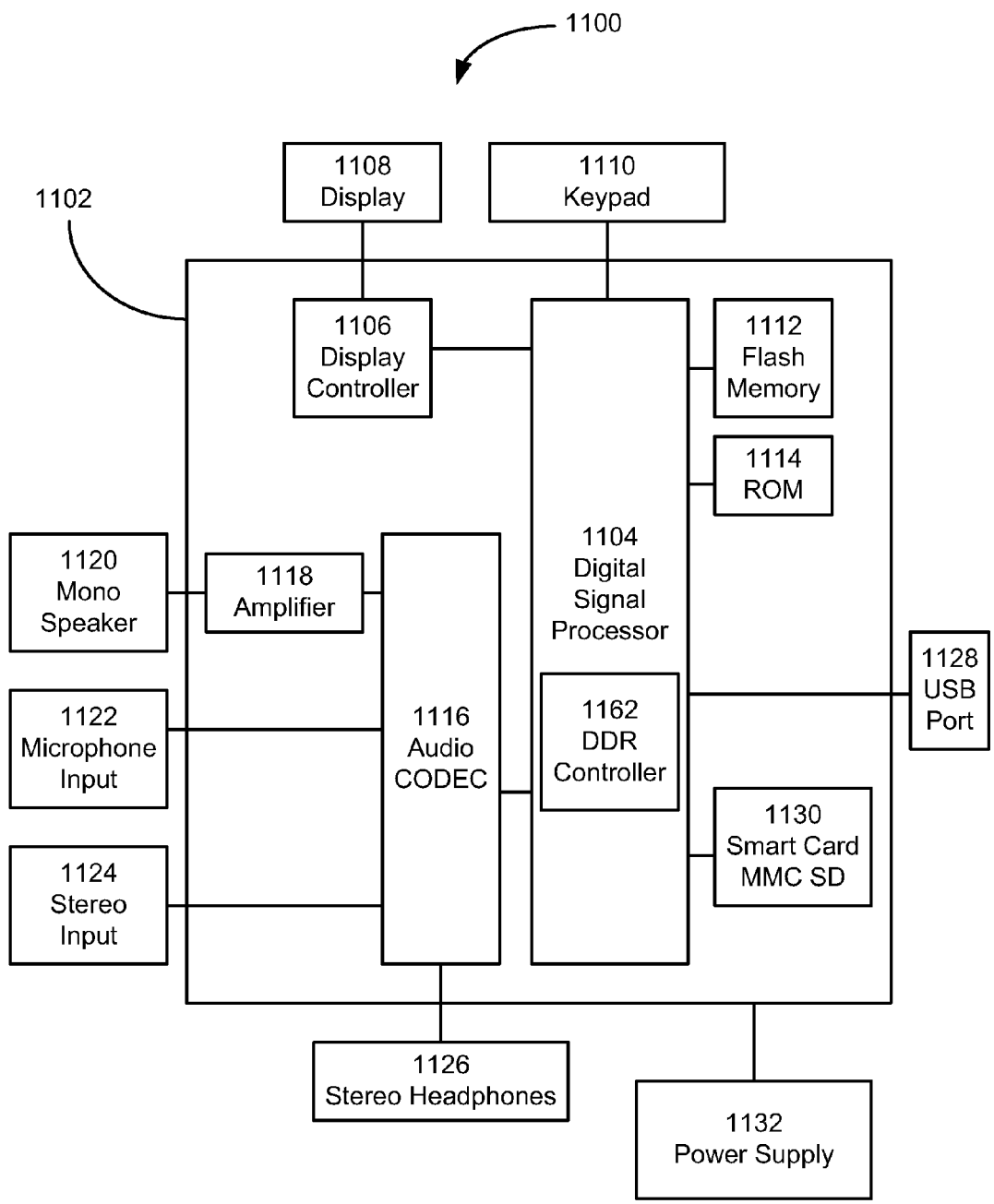
FIG. 11 is a diagram illustrating an example audio file player that may include a dual X-bit channel DDR memory interface architecture.

FIG. 11 is a diagram illustrating an exemplary embodiment of an audio file player (e.g., MP3 player) 1100. As shown, the audio file player 1100 includes an on-chip system 1102 that includes a digital signal processor (DSP) 1104. A display controller 1106 may be coupled to the DSP 1104 and a display 1108 is coupled to the display controller 1106. In an exemplary embodiment, the display 1108 is a liquid crystal display (LCD). A keypad 1110 may be coupled to the DSP 1104.

As further depicted in the general diagram of FIG. 11, a flash memory 1112 and a read only memory (ROM) 1114 may be coupled to the DSP 1104. Additionally, in a particular embodiment, an audio CODEC 1116 may be coupled to the DSP 1104. An amplifier 1118 may be coupled to the audio CODEC 1116 and a mono speaker 1120 may be coupled to the amplifier 1118. The general diagram of FIG. 11 further indicates that a microphone input 1122 and a stereo input 1124 may also be coupled to the audio CODEC 1116. In a particular embodiment, stereo headphones 1026 may also be coupled to the audio CODEC 1116.

A USB port 1128 and a smart card 1130 may be coupled to the DSP 1104. Additionally, a power supply 1132 may be coupled to the on-chip system 1102 and may provide power to the various components of the audio file player 1100.

As indicated in the general diagram of FIG. 11 the display 1108, the keypad 1110, the mono speaker 1120, the microphone input 1122, the stereo input 1124, the stereo headphones 1126, the USB port 1128, and the power supply 1132 are external In a particular embodiment, the DSP 1104 includes a DDR controller 1162, such as is described with reference to FIGS. 1-3, that can manage data flow between DSP 1104 and memory 1112 and that can provide a performance increase relative to a single 2X-bit channel architecture without increasing pin count.

General

The foregoing description of the embodiments of the inventive concepts disclosed herein has been presented only for the purpose of illustration and description and is not intended to be exhaustive or to limit the inventive concepts disclosed herein to the precise forms disclosed. Numerous modifications and adaptations are apparent to those skilled in the art without departing from the spirit and scope of the inventive concepts disclosed herein.

What is claimed is:

1. A memory structure, comprising:
a memory controller configured to receive a clock signal and to be coupled to a plurality of memory modules;
wherein the memory controller is configured to be coupled to each memory module of the plurality of memory modules via a common address/control bus;
wherein the memory controller is configured to send a separate chip select signal to each memory module of the plurality of memory modules;
wherein the memory controller is further configured to issue a first command to a first one of the plurality of memory modules across the address/control bus and to issue a second command to a second one of the plurality of memory modules across the address/control bus during a time period following the issuance of the first command.

2. The memory structure of claim 1, wherein
the clock signal comprises even and odd cycles, wherein the plurality of memory modules comprises a first memory module and a second memory module, and
wherein the memory controller issues commands across the address/control bus to the first memory module on even cycles of the clock signal and issues commands across the address/control bus to the second memory module on odd cycles of the clock signal.

3. The memory structure of claim 1, wherein the memory controller is configured to wait at least a period of time as determined by a previously issued command to a first memory module of the plurality of memory modules before issuing a subsequent command to the first memory module of the plurality of memory modules and is further configured to issue a command to a second memory module of the plurality of memory modules during the period of time as determined by the previously issued command to the first memory module of the plurality of memory modules.

4. The memory structure of claim 1 wherein the memory structure is disposed within a portable communication device.

5. The memory structure of claim 1 wherein the memory controller is configured to activate a first chip select signal at the time of issuing the first command and a second chip select signal at the time of issuing the second command.

6. The memory structure of claim 1 wherein the time period is associated with the first command.

7. A memory structure comprising
a memory controller configured to receive a clock signal and to be coupled to a first memory module and to a second memory module via a single address/control bus;
wherein the memory controller is configured to send a separate chip select signal to each of the first memory module and the second memory modules;
wherein the memory controller is configured to receive a first set of data from the first memory module via a first data bus and to receive a second set of data from the second memory module via a second data bus;
wherein the memory controller waits at least a period of time determined based on a previously issued command to the first memory module before issuing a subsequent command to the first memory module and wherein the memory controller multiplexes issuance of commands across the address/control bus to the first and second memory modules to optimize bandwidth use of the address/control bus.

8. The memory structure of claim 7 wherein the memory structure is disposed within a portable device.

9. A memory structure, comprising:
a memory controller configured to receive a clock signal and to be coupled to a plurality of memory modules via a single address/control bus;

wherein the memory controller is configured to switch between sending a separate chip select signal to each memory module of the plurality of memory modules and sending the same chip select signal to each memory module of the plurality of memory modules;

wherein when the memory controller is configured to send a separate chip select signal to each memory module of the plurality of memory modules, the memory controller is further configured to issue a first command to a first one of the plurality of memory modules across the address/control bus and to issue a second command to a second one of the plurality of memory modules across the address/control bus during a time period following the issuance of the first command; and wherein when the memory controller is configured to send the same chip select signal to each memory module of the plurality of memory modules, the memory controller is further configured to issue a first command to any one of the plurality of memory modules across the address/control bus and to issue a subsequent second command to any one of the plurality of memory modules across the address/control bus.

10. The memory structure of claim 9, wherein when the memory controller is configured to send a separate chip select signal to each memory module of the plurality of memory modules, the memory controller is further configured to wait at least a period of time as determined by a previously issued command to a first memory module of the plurality of memory modules before issuing a subsequent command to the first memory module of the plurality of memory modules and is further configured to issue a command to a second memory module of the plurality of memory modules during the period of time as determined by the previously issued command to the first memory module of the plurality of memory modules.

11. The memory structure of claim 9 wherein the memory structure is disposed within a portable communication device.

12. A method, comprising:
identifying a cycle of a clock signal as an even cycle or an odd cycle;
issuing a first chip select signal and a first command to a first memory module across an address/control bus; and
issuing a second chip select signal and a second command to a second memory module across the address/control bus during a time period following issuance of the first command, wherein the first command is issued to the first memory module on an even cycle of the clock signal and wherein the second command is issued to the second memory module on an odd cycle of the clock signal.

13. The method of claim 12 wherein the time period is associated with the first command.

14. A method, comprising:
issuing a first chip select signal and a first command to a first memory module across an address/control bus;
issuing a second chip select signal and a second command to a second memory module across the address/control bus during a first time period following the issuance of the first command;
issuing a third chip select signal and a third command to the first memory module across the address/control bus after at least the first time period; and
issuing a fourth chip select signal and a fourth command to the second memory module after at least a second time period following issuance of the second command.

15. The method of claim 14, further comprising:
monitoring a clock signal comprising odd and even cycles;
issuing a command to the first memory module only on an even clock cycle; and
issuing a command to the second memory module only on an odd clock cycle.

16. The method of claim of claim 14 wherein the first time period is associated with the first command and the second time period is associated with the second command.

17. The method of claim 14 further comprising
multiplexing commands to the first and second memory modules to optimize bandwidth use of the address/control bus.

18. The method of claim 17 wherein the first time period is associated with the first command and the second time period is associated with the second command.

19. A method, comprising:
receiving a clock signal at a memory controller that is coupled to a plurality of memory modules, wherein the memory controller is coupled to each memory module of the plurality of memory modules via a common address/control bus and wherein the memory controller is configured to send a separate chip select signal to each memory module of the plurality of memory modules;
issuing a first command to a first of the plurality of memory modules across the address/control bus; and
issuing a second command to a second of the plurality of memory modules across the address/control bus during a time period following the issuance of the first command.

20. The method of claim 19, wherein the clock signal comprises even and odd cycles, wherein the plurality of memory modules comprises a first memory module and a second memory module, and wherein the memory controller issues commands to the first memory module on even cycles of the clock signal and issues commands to the second memory module on odd cycles of the clock signal.

21. The method of claim 19, wherein the memory controller is configured to wait at least a period of time as determined by a previously issued command to a first memory module of the plurality of memory modules before issuing a subsequent command to the first memory module of the plurality of memory modules and is further configured to issue a command to a second memory module of the plurality of memory modules during the period of time as determined by the previously issued command to the first memory module of the plurality of memory modules.

22. The method of claim 19, wherein the memory structure is disposed within a communication device.

23. The method of claim 19, wherein the memory controller is configured to activate a first chip select signal at the time of issuing the first command and a second chip select signal at the time of issuing the second command.

24. The method of claim 19, wherein the time period is associated with the first command.

25. An apparatus, comprising:
means for storing data, wherein the means for storing data comprises a plurality of memory modules;
means for controlling memory, wherein the means for controlling memory is configured to receive a clock signal and to be coupled to the plurality of memory modules;
wherein the means for controlling memory is configured to be coupled to each memory module of the plurality of memory modules via a common address/control bus;
wherein the means for controlling memory is configured to send a separate chip select signal to each memory module of the plurality of memory modules; and
wherein the means for controlling memory is further configured to issue a first command to a first of the plurality of memory modules across the address/control bus and to issue a second command to a second of the plurality of memory modules across the address/control bus during a time period following the issuance of the first command.

26. The method of claim 25, wherein the means for controlling memory is configured to wait at least a period of time as determined by a previously issued command to a first memory module of the plurality of memory modules before issuing a subsequent command to the first memory module of the plurality of memory modules and is further configured to issue a command to a second memory module of the plurality of memory modules during the period of time as determined by the previously issued command to the first memory module of the plurality of memory modules.

27. A non-transitory computer-readable medium including program code that, when executed by a processor, causes the processor to:
 receive a clock signal at a memory controller that is coupled to a plurality of memory modules, wherein the memory controller is coupled to each memory module of the plurality of memory modules via a common address/control bus and wherein the memory controller is configured to send a separate chip select signal to each memory module of the plurality of memory modules;
 issue a first command to a first of the plurality of memory modules across the address/control bus; and
 issue a second command to a second of the plurality of memory modules across the address/control bus during a time period following the issuance of the first command.

28. The non-transitory computer-readable medium of claim 27, wherein the clock signal comprises even and odd cycles, wherein the plurality of memory modules comprises a first memory module and a second memory module, and wherein the processor issues commands to the first memory module on even cycles of the clock signal and issues commands to the second memory module on odd cycles of the clock signal.

29. An apparatus, comprising
 means for storing data, wherein the means for storing data comprises a first memory module and a second memory module;
 means for controlling memory, wherein the means for controlling memory is configured to receive a clock signal and to be coupled to the first memory module and to the second memory module via a single address/control bus;
 wherein the means for controlling memory is configured to send a separate chip select signal to each of the first memory module and the second memory module;
 wherein the means for controlling memory is configured to receive a first set of data from the first memory module via a first data bus and to receive a second set of data from the second memory module via a second data bus;
 wherein the means for controlling memory waits at least a period of time determined based on a previously issued command to the first memory module before issuing a subsequent command to the first memory module and wherein the means for controlling memory multiplexes issuance of commands across the address/control bus to the first and second memory modules.

30. The apparatus of claim 28, wherein the means for controlling memory is disposed within a communication device.

31. An apparatus comprising:
 means for storing data, wherein the means for storing data comprises a plurality of memory modules;
 means for controlling memory, wherein the means for controlling memory is configured to receive a clock signal and to be coupled to the plurality of memory modules via a single address/control bus;
 wherein the means for controlling memory is configured to switch between sending a separate chip select signal to each memory module of the plurality of memory modules and sending the same chip select signal to each memory module of the plurality of memory modules;
 wherein when the means for controlling memory is configured to send a separate chip select signal to each memory module of the plurality of memory modules, the means for controlling memory is further configured to issue a first command to a first of the plurality of memory modules across the address/control bus and to issue a second command to a second of the plurality of memory modules across the address/control bus during a time period following the issuance of the first command; and
 wherein when the means for controlling memory is configured to send the same chip select signal to each memory module of the plurality of memory modules, the means for controlling memory is further configured to issue a first command to any of the plurality of memory modules across the address/control bus and to issue a subsequent second command to any of the plurality of memory modules across the address/control bus.

32. The apparatus of claim 31, wherein when the means for controlling memory is configured to send a separate chip select signal to each memory module of the plurality of memory modules, the means for controlling memory is further configured to wait at least a period of time as determined by a previously issued command to a first memory module of the plurality of memory modules before issuing a subsequent command to the first memory module of the plurality of memory modules and is further configured to issue a command to a second memory module of the plurality of memory modules during the period of time as determined by the previously issued command to the first memory module of the plurality of memory modules.

33. The apparatus of claim 31, wherein the means for controlling memory is disposed within a communication device.

34. A non-transitory computer-readable medium including program code that, when executed by a processor, causes the processor to:
 identify a cycle of a clock signal as an even cycle or an odd cycle;
 issue a first chip select signal and a first command to a first memory module across an address/control bus; and
 issue a second chip select signal and a second command to a second memory module across the address/control bus during a time period following issuance of the first command, wherein the first command is issued to the first memory module during an even cycle of the clock signal and wherein the second command is issued to the second memory module during an odd cycle of the clock signal.

35. The non-transitory computer-readable medium of claim 34, wherein the time period is associated with the first command.

36. A non-transitory computer-readable medium including program code that, when executed by a processor, causes the processor to:
 issue a first chip select signal and a first command to a first memory module across an address/control bus;

issue a second chip select signal and a second command to a second memory module across the address/control bus during a first time period following the issuance of the first command;

issue a third chip select signal and a third command to the first memory module across the address/control bus after the first time period; and issue a fourth chip select signal and a fourth command to the second memory module after at least a second time period following issuance of the second command.

37. The non-transitory computer-readable medium of claim 36, further including program code that, when executed by the processor, causes the processor to:

monitor a clock signal comprising odd and even cycles;

issue a command to the first memory module only on an even clock cycle; and issue a command to the second memory module only on an odd clock cycle.

* * * * *